US012372098B2

(12) United States Patent
Rhyner

(10) Patent No.: US 12,372,098 B2
(45) Date of Patent: Jul. 29, 2025

(54) FLUID PRESSURE COMPENSATION APPARATUS

(71) Applicant: Eddy Pump Corporation, El Cajon, CA (US)

(72) Inventor: Phillip Rhyner, El Cajon, CA (US)

(73) Assignee: Eddy Pump Corporation

( * ) Notice: Subject to any disclaimer, the term of this patent is extended or adjusted under 35 U.S.C. 154(b) by 76 days.

(21) Appl. No.: 18/237,266

(22) Filed: Aug. 23, 2023

(65) Prior Publication Data

US 2025/0067267 A1 Feb. 27, 2025

(51) Int. Cl.
*F04D 29/10* (2006.01)
*F04D 15/00* (2006.01)
*F04D 29/08* (2006.01)

(52) U.S. Cl.
CPC ....... *F04D 29/106* (2013.01); *F04D 15/0027* (2013.01); *F04D 29/086* (2013.01); *F05D 2270/3015* (2013.01)

(58) Field of Classification Search
CPC .. F04D 29/106; F04D 29/108; F04D 15/0027; F04D 29/086; F05D 2270/3015; F16L 55/04; F16L 55/053; F16L 55/054; F15B 1/24; F15B 2201/31; F16J 15/3492; F16J 15/164
See application file for complete search history.

(56) References Cited

U.S. PATENT DOCUMENTS

| | | | | | |
|---|---|---|---|---|---|
| 1,937,461 | A * | 11/1933 | Lauritz | F16J 15/3404 | 415/113 |
| 1,990,519 | A * | 2/1935 | Bigelow | F04D 29/108 | 277/516 |
| 2,190,670 | A * | 2/1940 | Mann | F04D 29/428 | 415/113 |
| 3,434,728 | A * | 3/1969 | Soldato | F16J 15/185 | 277/516 |
| 4,168,936 | A * | 9/1979 | Scheller | F04D 29/108 | 277/362 |
| 4,224,009 | A * | 9/1980 | Grandi | F04D 13/086 | 415/168.3 |
| 4,342,537 | A * | 8/1982 | Goyne | F04D 29/4273 | 415/230 |
| 4,351,531 | A * | 9/1982 | Maasberg | F16J 15/186 | 277/516 |
| 4,621,981 | A * | 11/1986 | Lorett | F16J 15/3484 | 415/168.2 |
| 4,990,055 | A * | 2/1991 | Korenblit | F16J 15/40 | 415/230 |

(Continued)

*Primary Examiner* — Bryan M Lettman
(74) *Attorney, Agent, or Firm* — Global IP Counselors, LLP

(57) ABSTRACT

A fluid pressure compensation apparatus includes a pipe, a pressure measuring device, a pressure compensating structure and a connecting mechanism. The pressure measuring device in fluid communication with the pipe. The pressure compensating structure is filled with a hydraulic fluid. The connecting mechanism is coupled to the pressure measuring device and coupled to the pressure compensating structure such that changes in pressure within the pipe measured by the pressure measuring device are mechanically transmitted via the connecting mechanism to the pressure compensating structure causing corresponding movement of the hydraulic fluid in and out of the pressure compensating structure.

19 Claims, 11 Drawing Sheets

(56) References Cited

U.S. PATENT DOCUMENTS

| | | | | |
|---|---|---|---|---|
| 5,211,532 | A * | 5/1993 | Thompson | F16J 15/46 415/113 |
| 5,256,038 | A * | 10/1993 | Fairman | F04D 29/108 417/423.14 |
| 5,746,435 | A * | 5/1998 | Arbuckle | F16J 15/3484 277/304 |
| 2003/0053907 | A1 * | 3/2003 | Lippert | F04D 29/104 415/168.2 |

* cited by examiner

FLUID PRESSURE COMPENSATION APPARATUS

BACKGROUND

Technical Field

The present disclosure generally relates to a fluid pressure compensation apparatus for a pump. More specifically, the present disclosure relates to a fluid pressure compensation apparatus that measures changes in fluid pressure in a pipe upstream of a booster pump and compensates measured changes in fluid pressure within a seal supporting chamber of the booster pump.

Background Information

In pumping systems where large volumes of liquid, water, sludge and/or slurry is being pumped, changes in fluid pressure within a pipe upstream of a booster pump can put stress on seals within the booster pump.

SUMMARY

It has been discovered that measurement of changes in fluid pressure within a pipe upstream of a pump can be used to adjust the fluid pressure behind seals within the pump to avoid pre-mature wear of the seals.

In view of the state of the known technology, one aspect of the present disclosure is to provide a fluid pressure compensation apparatus including a pipe, a pressure measuring device, a pressure compensating structure and a connecting mechanism. The pressure measuring device in fluid communication with the pipe. The pressure compensating structure is filled with a hydraulic fluid. The connecting mechanism is coupled to the pressure measuring device and coupled to the pressure compensating structure such that changes in pressure within the pipe measured by the pressure measuring device are mechanically transmitted via the connecting mechanism to the pressure compensating structure causing corresponding movement of the hydraulic fluid in and out of the pressure compensating structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
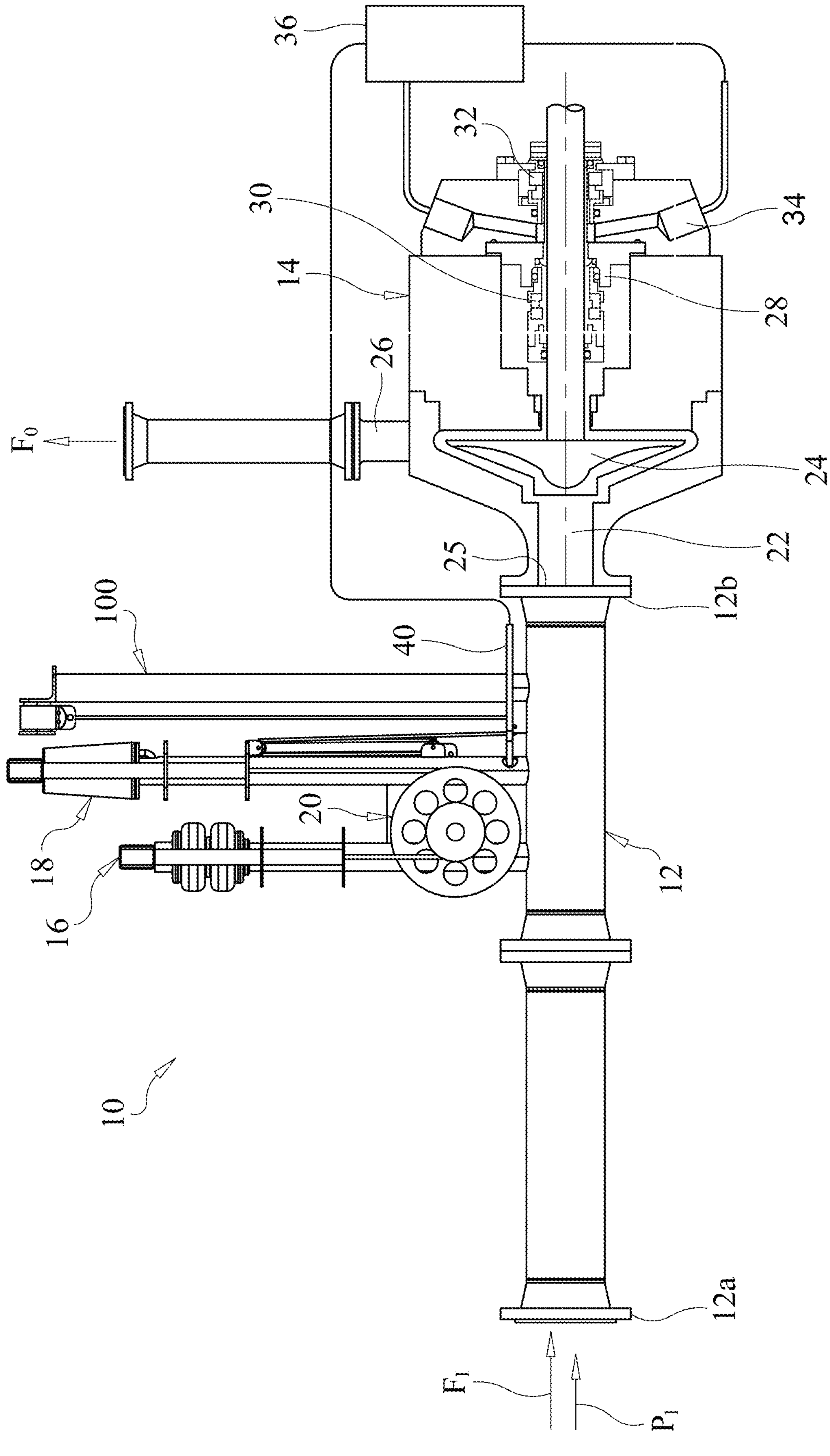
FIG. 1 a fluid pressure compensation apparatus having a pipe attached to a booster pump, the pipe having a pressure measuring device, a pressure compensating structure and a connecting mechanism attached thereto in accordance with a first embodiment.

Referring initially to FIG. 1, a fluid pressure compensation apparatus 10 is illustrated in accordance with a first embodiment. The fluid pressure compensation apparatus 10 (hereinafter the apparatus 10) includes a pipe 12, pump 14, a pressure measuring device 16, a pressure compensating structure 18 and a connecting mechanism 20. The pipe 12 and pump 14 are oriented such that at a first end of the pipe 12*a*, fluid flows into the pipe 12 in an in-direction $F_I$ and flows out of the pump 14 in an out-direction $F_O$.

The pressure measuring device 16 basically detects changes in fluid pressure within the pipe 12 and via the connecting mechanism 20 causes the pressure compensating structure 18 to make corresponding changes in fluid pressure within chambers of a booster pump 14, as described in greater detail below.

The pipe 12 is preferably for use in moving large amounts of liquid or slurry, or any other pumpable material. The section of the pipe 12 above water level or sea level. The first end 12*a* of the pipe 12 is preferably connected to further sections of pipe that are submerged in a liquid or slurry. The first end 12*a* can further be connected to a pump (not shown) that moves water, liquid, debris or slurry (or any other material) from below the uppers surface of a body of water or other liquid to be transported through the pipe 12. A second end 12*b* of the pipe 12 is connected to the booster pump 14 (hereinafter the pump 14) that further draws the water, liquid, debris, or slurry out of the pipe 12 and to another storage unit, such as a tank (not shown), truck (not shown) or other receptacle (not shown).

The pump 14 defines a pumping chamber 22 that is in direct fluid communication with the pipe 12. The pumping chamber 22 can include, for example, an impeller 24 that is rotated to draw fluid from the pipe 12 via an inlet 25 to an outlet 26. The pump 14 also a pressure chamber 28 and seal structures 30 and 32. The seal structures 30 and 32 create a boundary between the pumping chamber 22 and the pressure chamber 28. The pressure chamber 28 can include, for example, a circulating lubricating/hydraulic passageway 34 that serves to lubricate the seal structure 30 and 32 and balance the internal pressures within the pump 14 on the two sides of the boundary defined by the seal structures 30 and 32.

The circulating lubricating/hydraulic passageway 34 can be connected to a tank 36 with a conventional internal pump (not shown) and a conventional heater (not shown) that circulates lubricating/hydraulic fluid through the circulating lubricating/hydraulic passageway 34. As is described further below, the tank 36 is connected to the pressure compensating structure 18 via a tube 40. Changes in the fluid pressure within the pressure compensating structure 18 are transmitted through a tube 40 to the tank 36 and from the tank to the circulating lubricating/hydraulic passageway 34, as described in greater detail below.

As shown in FIGS. 3-9, the pressure measuring device 16 (a pressure responsive device) includes a hollow vertical tube 44, a movable frame 46 and a bladder 48. The vertical tube 44 is welded or otherwise rigidly fixed to the pipe 12. The pipe 12 has an opening in fluid communication with the hollow interior of the pipe 12 upstream of the pump 14.

The movable frame 46 includes a lower brace 50, an upper brace 52, two tubes 54 and an upper cross-member 56 that are all rigidly fixed to one another. The braces 50 and 52 and the cross-member 56 are parallel and spaced apart from one another.

The tubes 54 are welded or otherwise rigidly fixed to a lower surface of the cross-member 56. The lower brace 50 and the upper brace 52 are welded or otherwise rigidly fixed to each of the tubes 54 such that the movable frame 46 defines a ladder-like structure. The lower brace 50 and the upper brace 52 include openings 58 with the vertical tube 44 extending therethrough. The movable frame 46 is not directly connected to the vertical tube 44 and can vertically move relative to the vertical tube 44.

The bladder 48 is a pressure sensitive hollow element that has an at rest length when filled with fluid at a predetermined pressure. The bladder 48 can increase in length in response to the hollow interior being subjected to increases in pressure. In response to decreases in the pressure within the hollow interior of the bladder 48, the length of the bladder 48 decreases accordingly.

The bladder 48 is designed and dimensioned such that the changes in overall length of the bladder 48 are generally linear. The bladder 48 can be specially made for the pressure measuring device 16. Or, as shown in FIGS. 3-9, the bladder 48 can be an off-the-shelf airbag often used in vehicle suspension assemblies. For example, the bladder 48 can be an airbag used in automobile pneumatic suspension systems and/or pneumatic commercial tractor/trailer suspension systems. The bladder 48 is provided with an open bottom 60 that is fixed to the upper end of the vertical tube 44. Therefore, the bladder 48 is in fluid communication with the pipe 12 via the vertical tube 44. Hence, any changes in fluid pressure within the pipe 12 cause corresponding changes in overall length of the bladder 48. Specifically, increases in fluid pressure within the pipe 12 cause the bladder 48 to increase in length $L_1$. Similarly, decreases in fluid pressure within the pipe 12 cause the bladder 48 to decrease in length $L_1$.

An upper end 62 of the bladder 48 contacts and is fixedly attached to a central underside of the upper cross-member 56. In other words, the bladder 48 is retained from above by the upper cross-member 56 and retained from below by the vertical tube 44. Since the vertical tube 44 is fixedly attached to the pipe 12, and the bladder 48 fixed to the upper end of the vertical tube 44, any changes in the length $L_1$ cause corresponding changes in height $H_1$ of the movable frame 46, since the movable frame 46 is able to undergo vertical movement along the vertical tube 44.

The pressure compensating structure 18 includes a vertical support tube 70, a movable frame 72 and a fluid filled bladder 74. Like the movable frame 46, the movable frame 72 includes a lower brace 76, an upper brace 78, tubes 80 and an upper cross-member 82. The lower brace 76, the upper brace 78, the tubes 80 and an upper cross-member 82 are rigidly fixed together in a manner similar to the movable frame 46, and therefore further description is omitted for the sake of brevity. Like the movable frame 46, the lower and upper braces 76 and 78 include centered openings 84 such that the movable frame 72 can be moved vertically relative to the vertical support tube 70.

The fluid filled bladder 74 (hereinafter the bladder 74) is filled with a hydraulic/lubricating liquid compatible with the seals 30 and 32 (and other elements) of the pump 14. The bladder 74 is in direct fluid communication with the pressure chamber 28 of the pump 14, as is shown in FIGS. 1 and 9 via the tube 40.

Figure 9:
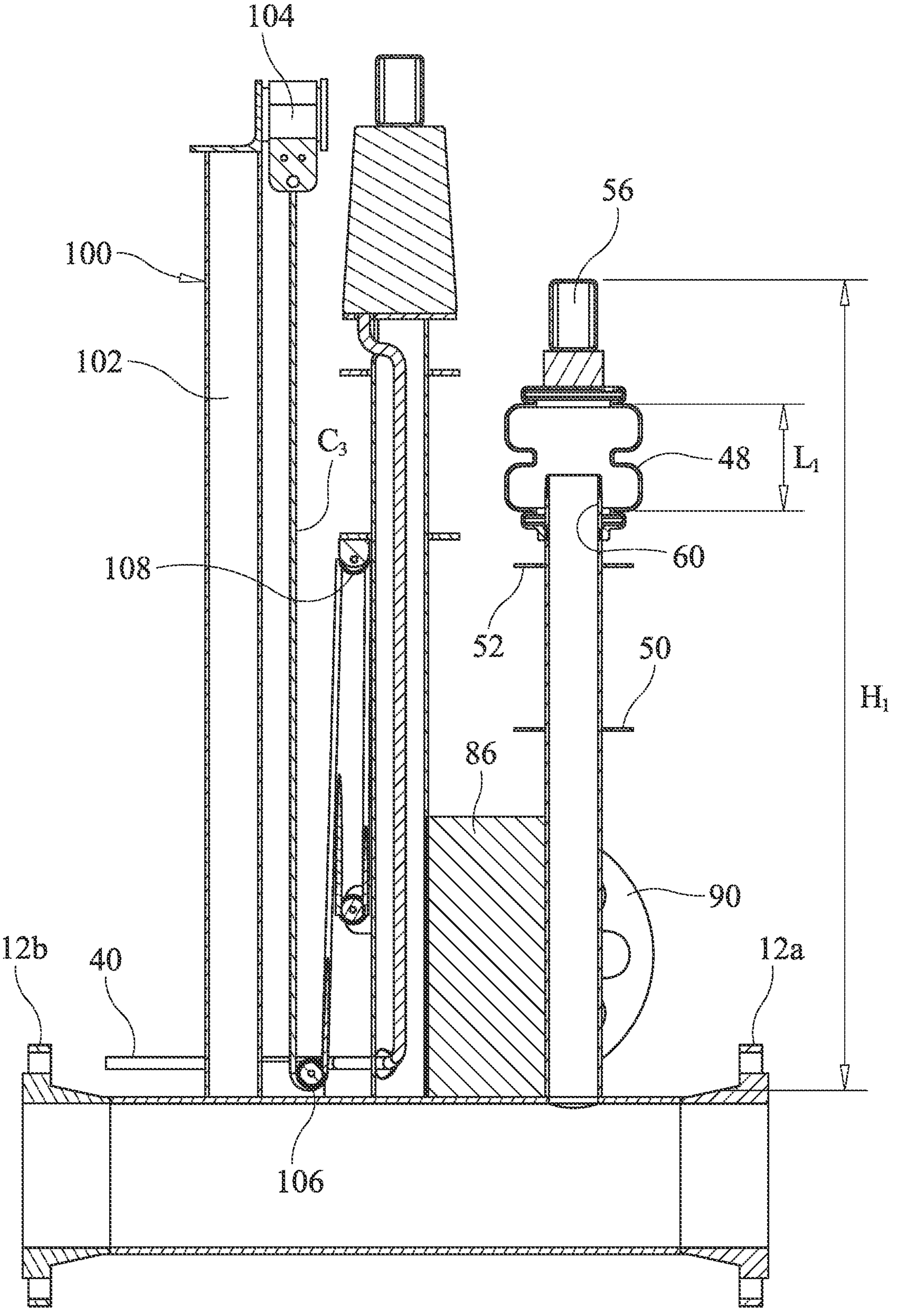
FIG. 9 is a cross-sectional view of the pipe showing details of the pressure measuring device, the pressure compensating structure and the connecting mechanism in accordance with the first embodiment.

The vertical support tube 70 can be hollow such that the tube 40 can be concealed and protected within the vertical support tube 70, as shown in FIG. 9.

The vertical support tube 70 is attached to the exterior surface of the pipe 12 and is separated from the contents of the pipe 12.

The bladder 14 is attached to the top of the vertical support tube 70. An upper end of the bladder 14 is constrained by the upper cross-member 82 of the movable frame 72. Thus, downward movement of the movable frame 72 causes fluid pressure within the bladder 14 (and the pressure chamber 28 of the pump 14) to increase. Similarly, upward movement of the movable frame 72 causes fluid pressure within the bladder 14 (and the pressure chamber 28 of the pump 14) to decrease.

Movement of the movable frame 72 is controlled by the movement of the movable frame 46 via the elements of the connecting mechanism 20.

The connecting mechanism 20 includes a bracket 86, small pulleys 88, large pulleys 90, cables $C_1$ and cables $C_2$. The bracket 86 is welded or otherwise rigidly fixed at least one of the vertical tube 44, an upper area of the pipe 12 and/or the vertical support tube 70, or all three.

The small pulleys 88 and the large pulleys 90 are supported by the bracket 86 for rotatable movement about pivot shafts of the pulleys 88 and 90. The pulleys are paired with one small pulley 88 and one large pulley 90 being fixed together for rotation as a single unit on one side of the bracket 86, and the other small pulley 88 and large pulley 90 being fixed together for rotation as a single unit on an opposite side of the bracket 86.

One of the cables $C_1$ is fixed to a lower end of a corresponding one of the tubes 54 of the movable frame 46, with the other of the cables $C_1$ being fixed to a lower end of the other of the tubes 54 of the movable frame 46 as shown in FIGS. 3-8. The opposite ends of the cables $C_1$ are fixed to corresponding ones of the small pulleys 88 with sufficient length to wrap at least half-way around the small pulleys 88. Thus, linear movement of the movable frame 46 in response to changes in length of the bladder 48 pivots the small pulleys 88 is a corresponding rotational direction.

One of the cables $C_2$ is fixed to a lower end of a corresponding one of the tubes 80 of the movable frame 72, with the other of the cables $C_2$ being fixed to a lower end of the other of the tubes 80 of the movable frame 72 as shown in FIGS. 3-8. The opposite ends of the cables $C_2$ are fixed to corresponding ones of the large pulleys 90 with sufficient length to wrap at least half-way around the large pulleys 90. Thus, rotation or pivoting of the pulleys $C_1$ and $C_2$.

The difference in the diameters of the small pulleys 88 vs. the large pulleys 90 is such that the movement of the cables $C_2$ is greater than the movement of the cables $C_1$. It should be understood from the drawings and the description herein that the relative diameters of the small pulleys 88 compared to the large pulleys 90 is an adjustable relationship and is in part dependent upon various factors, such as the diameter of the pipe 12, the inner diameter and length of the tube 40, anticipated changes in pressure within the pipe 12 and the capacity and anticipated changes in fluid pressure within the pumping chamber 22 of the pump 14.

It should also be understood from the drawing and the description herein that the when the bladder 48 elongates (corresponding to increases in pressure within the pipe 12) the movable frame 72 is pulled downward towards the pipe 12 increasing the fluid pressure within the fluid filled bladder 74, tube 40 and the pressure chamber 28 of the pump 14. The converse is also true. Thus, when the fluid pressure within the pipe 12 increases, the fluid pressure within the pressure chamber 28 of the pump 14 is increased to compensate for the increase in pressure within the pumping chamber 22. Similarly, when the fluid pressure within the pipe 12 decreases, the fluid pressure within the pressure chamber 28 of the pump 14 is decreased to compensate for the decrease in pressure within the pumping chamber 22. Thus, the fluid pressures on either side of the seals 30 and 32 of the pump 14 are maintained close to equal, thereby protecting the seals 40 and 32.

During pumping operations, the fluid filled bladder 74 of the pressure compensating structure 18 is preferably balanced to maintain the fluid pressure therein at a predetermined level. The maintenance of the fluid pressure within the fluid filled bladder 74 (in the absence of pressure changes measured by the bladder 48 of the pressure measuring device 16) is accomplished by a pulley system 100.

Figure 4:
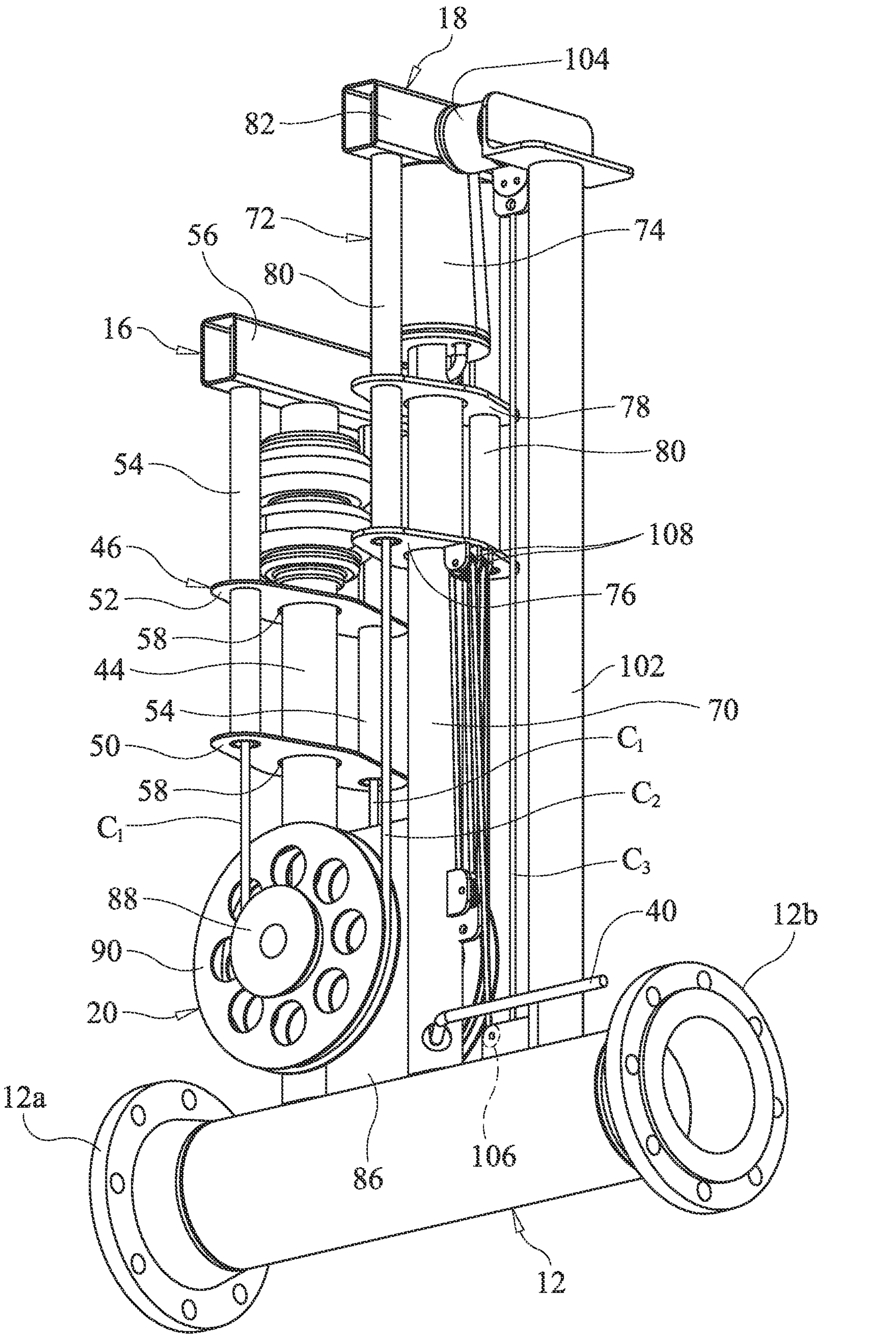
FIG. 4 is a second perspective view of the pipe, the pressure measuring device, the pressure compensating structure and the connecting mechanism separated from the booster pump in accordance with the first embodiment.
Figure 5:
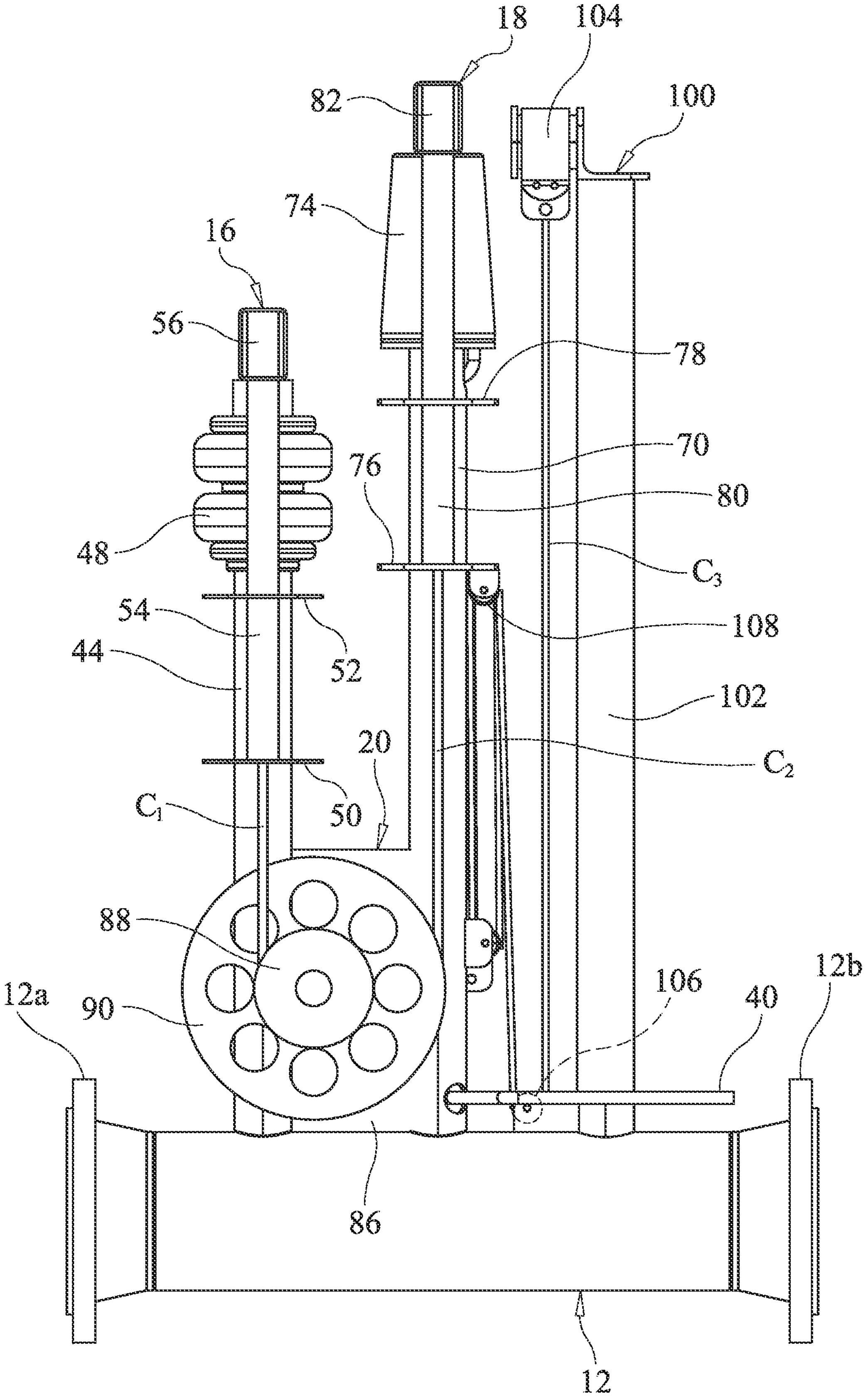
FIG. 5 is a first side view of the pipe, the pressure measuring device, the pressure compensating structure and the connecting mechanism in accordance with the first embodiment.
Figure 6:
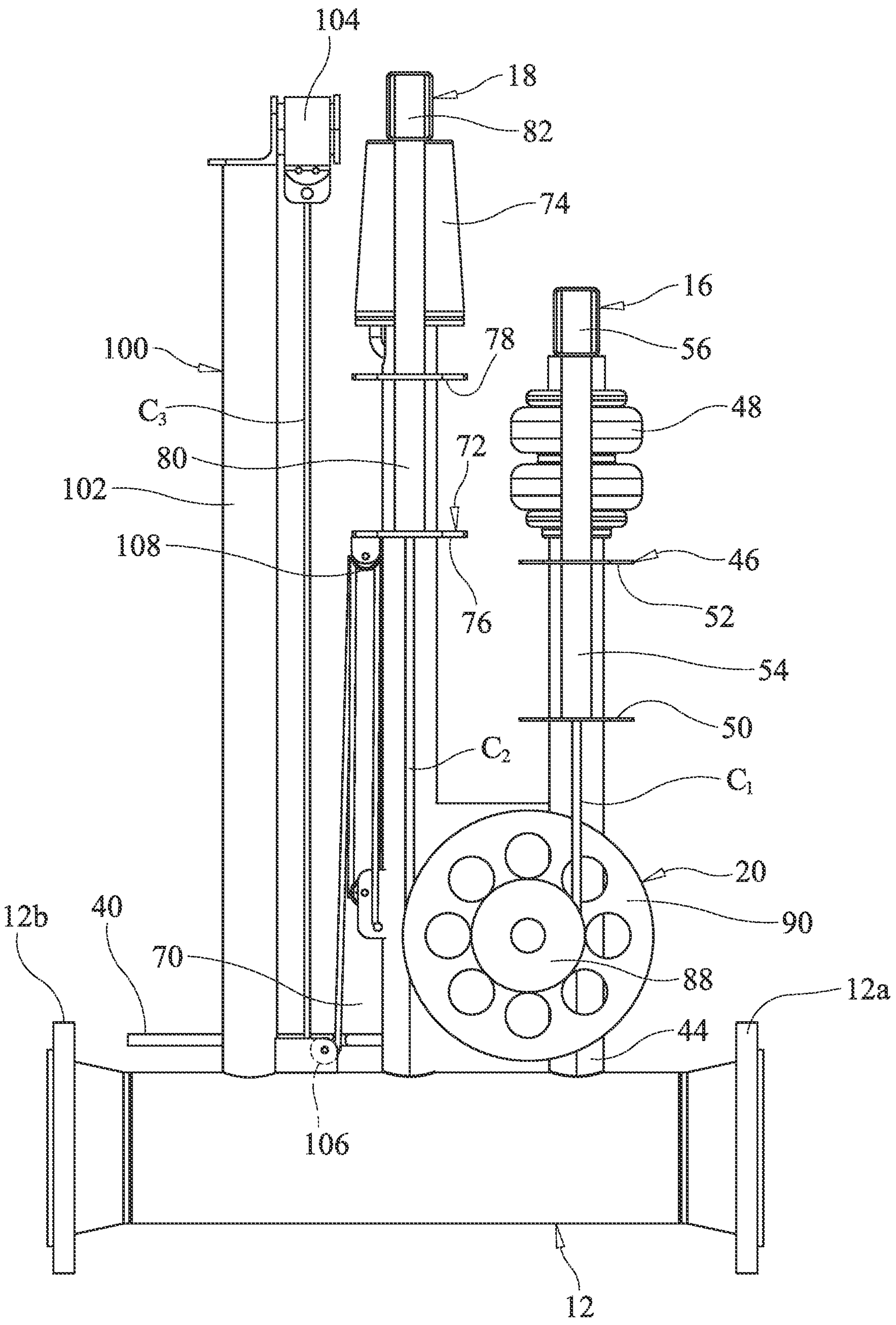
FIG. 6 is a second side view of the pipe, the pressure measuring device, the pressure compensating structure and the connecting mechanism in accordance with the first embodiment.
Figure 7:
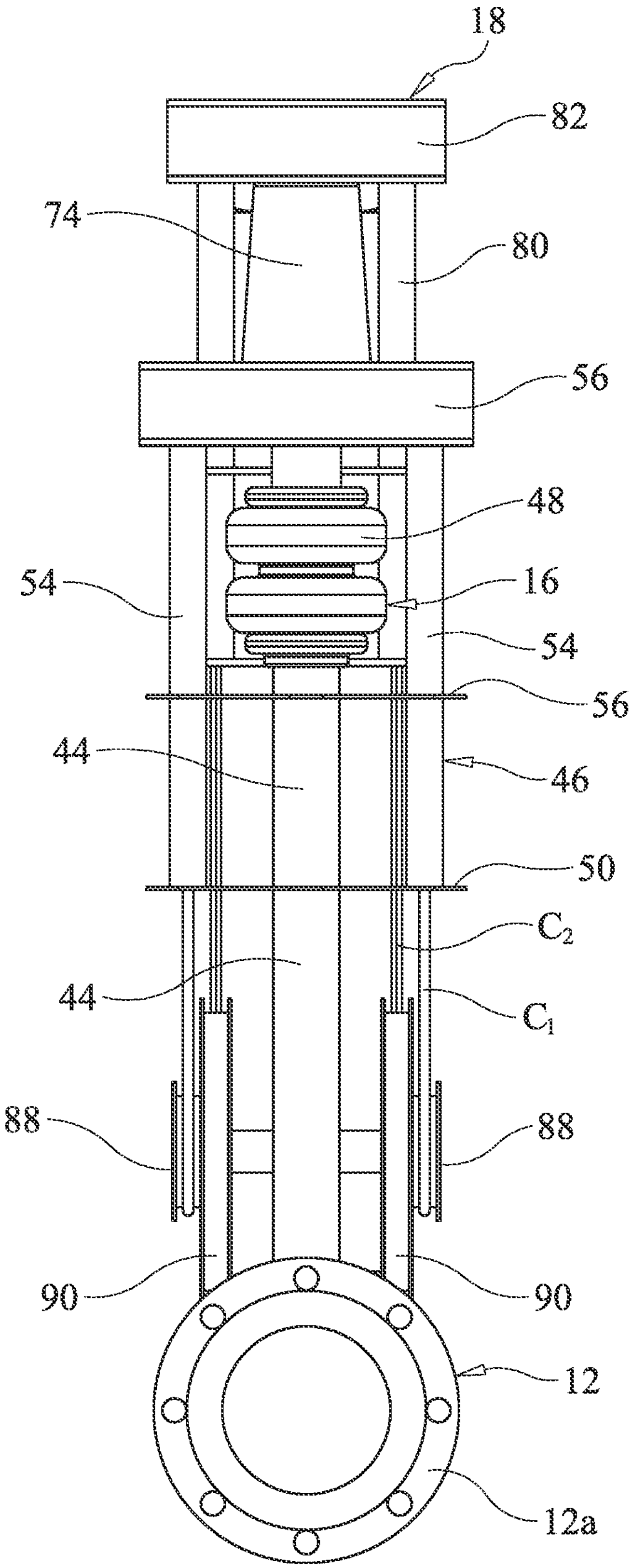
FIG. 7 is an end view of the pipe, the pressure measuring device, the pressure compensating structure and the connecting mechanism in accordance with the first embodiment.
Figure 8:
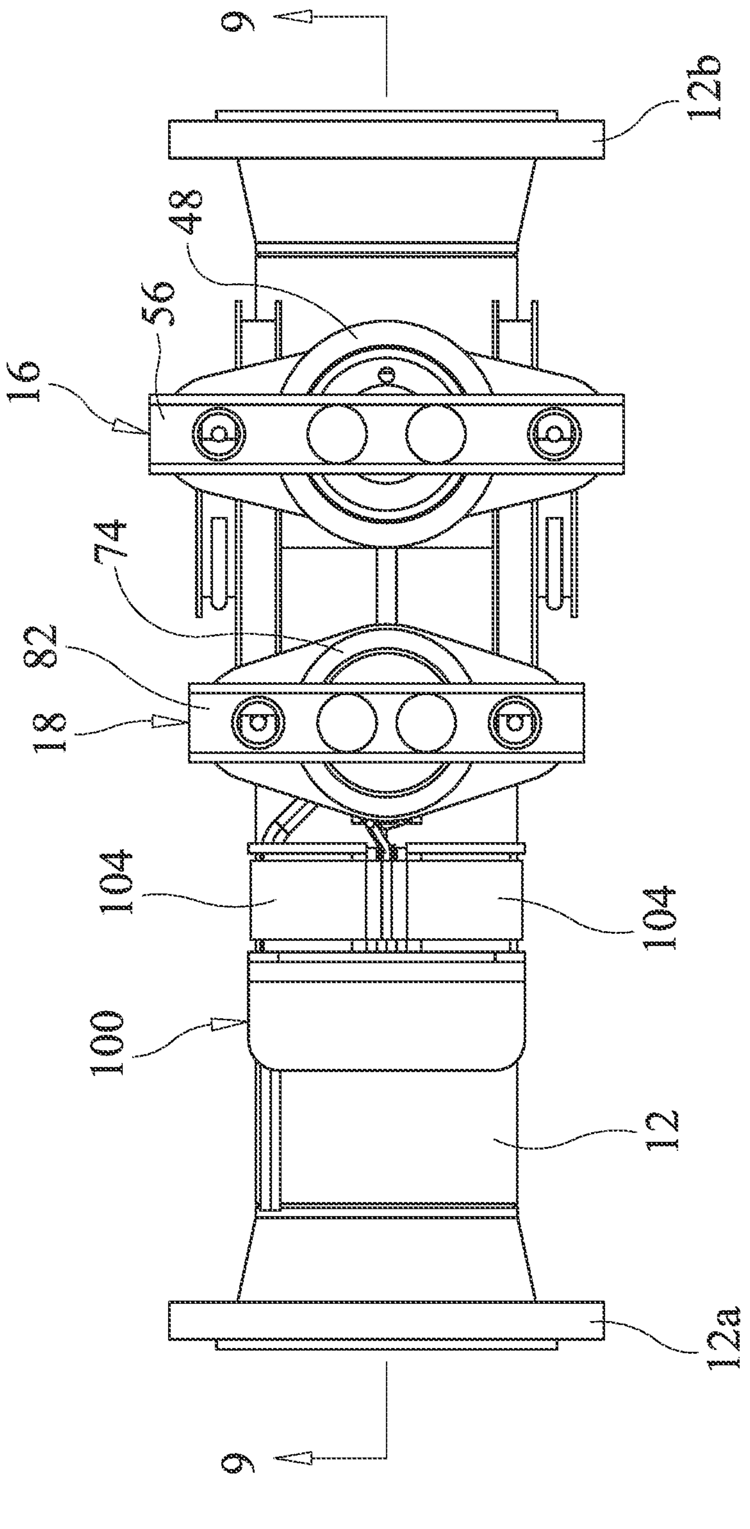
FIG. 8 is a top view of the pipe, the pressure measuring device, the pressure compensating structure and the connecting mechanism in accordance with the first embodiment.

As shown in FIGS. 4-5 and 9, the pulley system 100 includes a support tube 102, biasing devices 104, pulleys 106 and pulleys 108 and cables $C_3$. The support tube 102 is welded or otherwise rigidly fixed to the pipe 12 in vertical alignment with the vertical tube 44 and the vertical support tube 70. The support tube 102 is separated from the interior of the pipe 12 and is not exposed to the fluids within the pipe 12.

The biasing devices 104 are installed to the top of the support tube 102. The biasing devices 104 can be coil spring or other such biasing device that can apply an adjustable amount of pressure to the cables $C_3$. A first end of each of the cables $C_3$ is fixed to a corresponding one of the biasing devices 104. The cables $C_3$ wrap around the pulleys 106 and 108 with a second end of each of the cables $C_3$ being fixed to a portion of the vertical support tube 70, as shown in FIG. 4. The pulleys 108 are fixed to a bottom portion of the lower brace 76 of the movable frame 72 of the pressure compensating structure 18 and therefore apply force from the biasing devices 104 to the movable frame 72 maintaining at least a minimal amount of force on the fluid filled bladder 74.

The fluid pressure compensation apparatus 10 operates as follows. If the fluid pressure $P_1$ entering the pipe 12 (the flow in $F_I$) changes by increasing or decreasing, the fluid pressure within the vertical 44 experiences a corresponding change in fluid pressure. In response, the fluid pressure change within the bladder 48 of the pressure measuring device 16 causes the bladder 48 to make a corresponding change in its overall length $L_1$. The change in overall length $L_1$ of the bladder 48 is a measurement of the change in fluid pressure $P_1$. The change in overall length $L_1$ of the bladder 48 causes a corresponding movement of the movable frame 46 and the cable $C_1$. Correspondingly, the cable $C_2$ is further moved by movement of the pulleys 88 and 90. The movement of the cable $C_2$ in turn causes the movable frame 72 to compress the fluid filled bladder 74 or allow the fluid filled bladder 74 to elongate by a proportional amount (proportional to the movement of the cables $C_1$ and $C_2$). Thus, the overall length of the fluid filled bladder 74 changes inversely relative to the change in overall length of the bladder 48. Changes in the overall length of the fluid filled bladder 74 causes a corresponding change in pressure of the hydraulic/lubricating fluid flowing in and out of the tube 40 and hence to the booster pump 14.

The above operation of the fluid pressure compensation apparatus 10 provides a compensating change in the fluid pressure within the pressure chamber 28 of the booster pump 14. A consequence of the compensating change in fluid pressure within the pressure chamber 28 minimizes and possibly eliminate any difference in pressures between the pressure chamber 28 and the pumping chamber 22, thereby reducing wear and tear on the seal structures 30 and 32 and prolonging the operational life of the booster pump 14.

Second Embodiment

Figure 10:
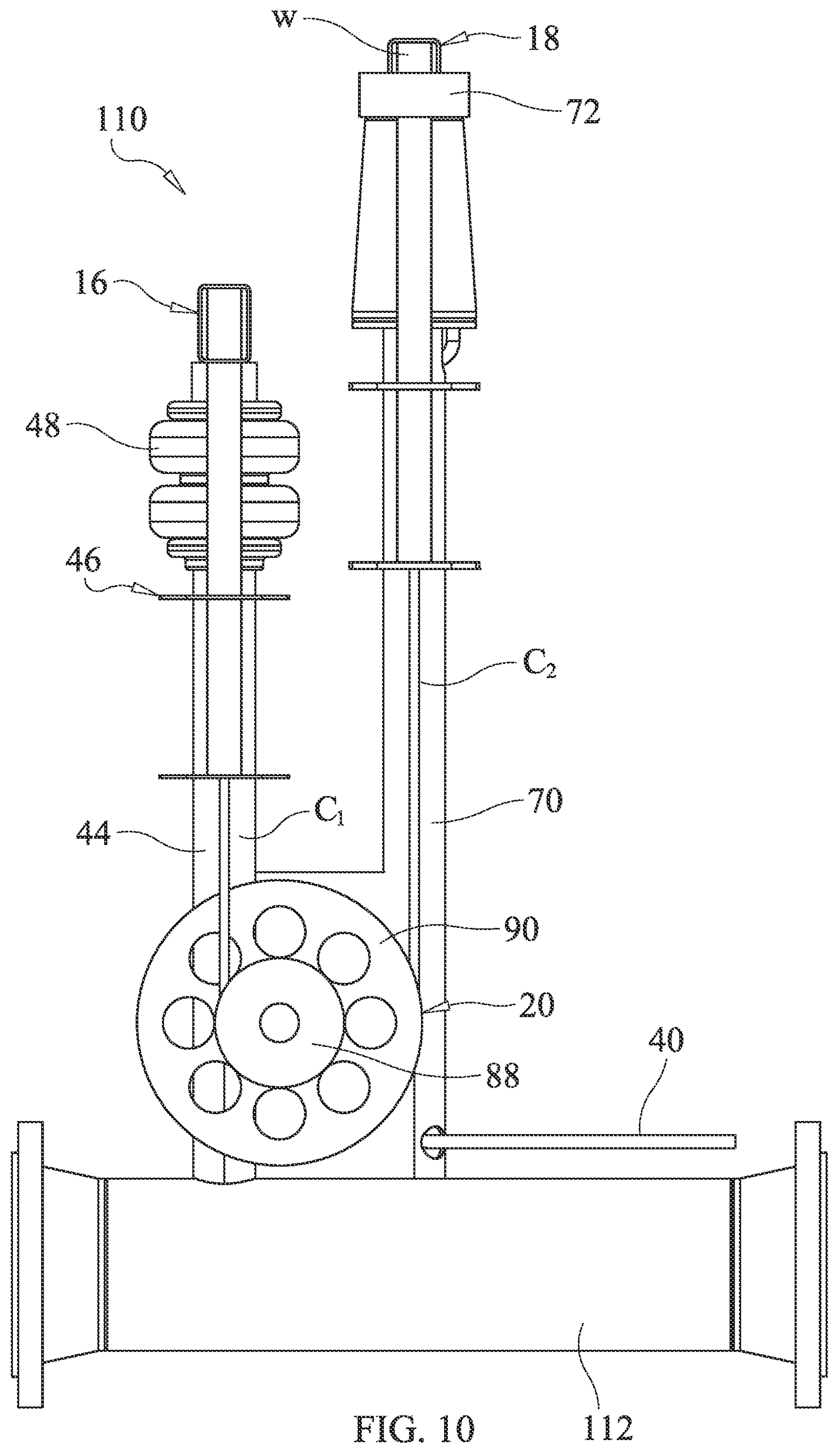
FIG. 10 is a side view of a fluid pressure compensation apparatus having a pipe with a pressure measuring device, a pressure compensating structure and a connecting mechanism in accordance with a second embodiment.

Referring now to FIG. 10, a fluid pressure compensation apparatus 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The fluid pressure compensation apparatus 110 includes a pipe 112, the pressure measuring device 16 (identical as described above with respect to the first embodiment), a pressure compensating structure 18 (basically the same as described above with respect to the first embodiment) and the connecting mechanism 20 (identical as described above with respect to the first embodiment). However, in the second embodiment, the pulley system 100 of the first embodiment has been omitted and replaced with a weight W, as described further below.

The pressure measuring device 16 includes the vertical tube 44, the movable frame 46, the cable $C_1$ and the bladder 48, as described above with respect to the first embodiment.

The pressure compensating structure 18 includes the tube 40, the vertical support tube 70, the movable frame 72 and the fluid filled bladder 74, as described above with respect to the first embodiment.

The connecting mechanism 20 includes the bracket 86, the small pulleys 88, the large pulleys 90 and the cables $C_2$. The cables $C_1$ are connected to movable frame 46 of the pressure measuring device 16 and to the small pulleys 88, as described above with respect to the first embodiment. Further, the cables $C_2$ are connected to the large pulleys 90 and the movable frame 72 of the connecting mechanism 20, as described above with respect to the first embodiment.

Figure 2:
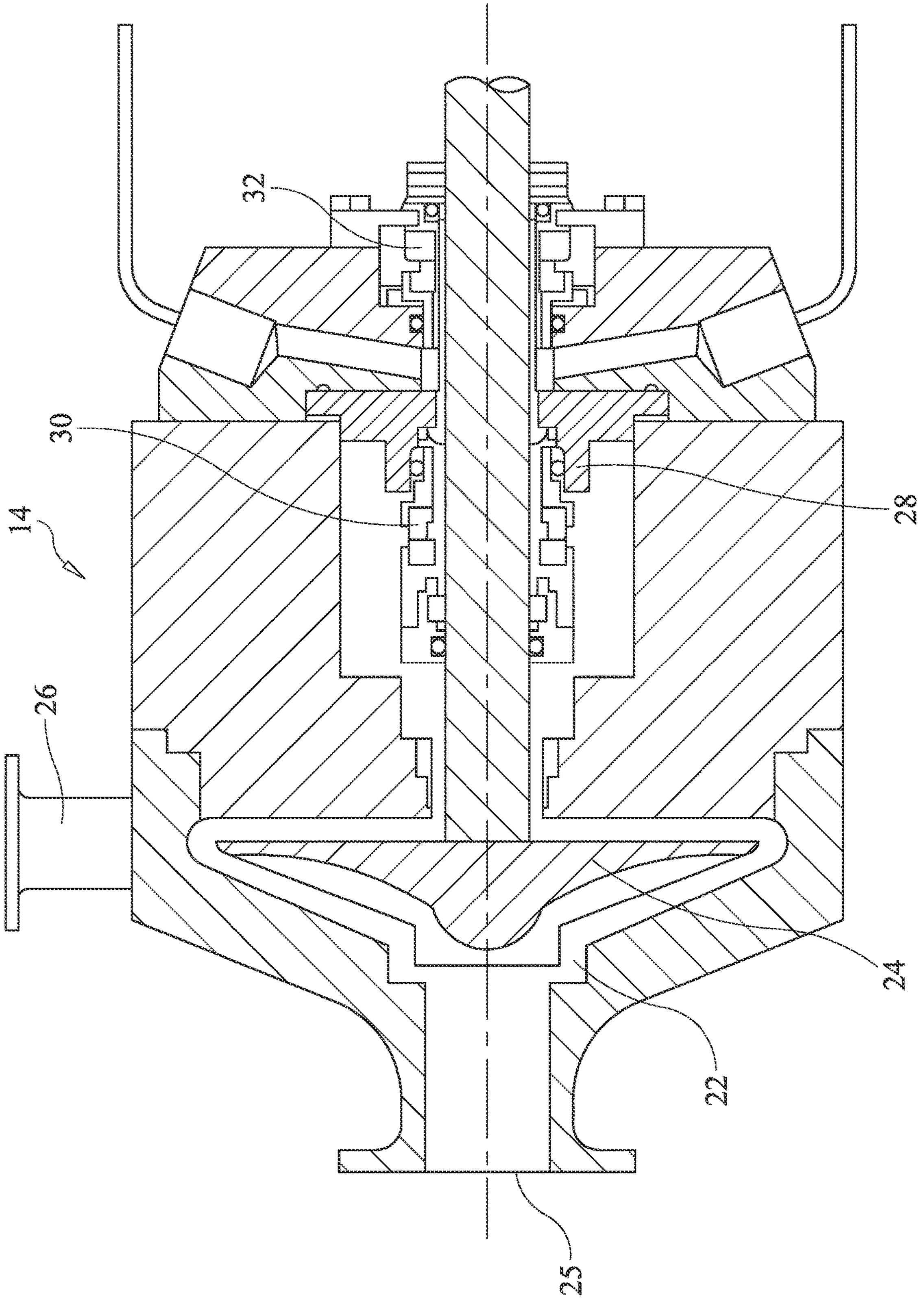
FIG. 2 is a cross-sectional view of the booster pump showing a pumping chamber, a pressure chamber and seal structures separating the pumping chamber from the pressure chamber in accordance with the first embodiment.
Figure 3:
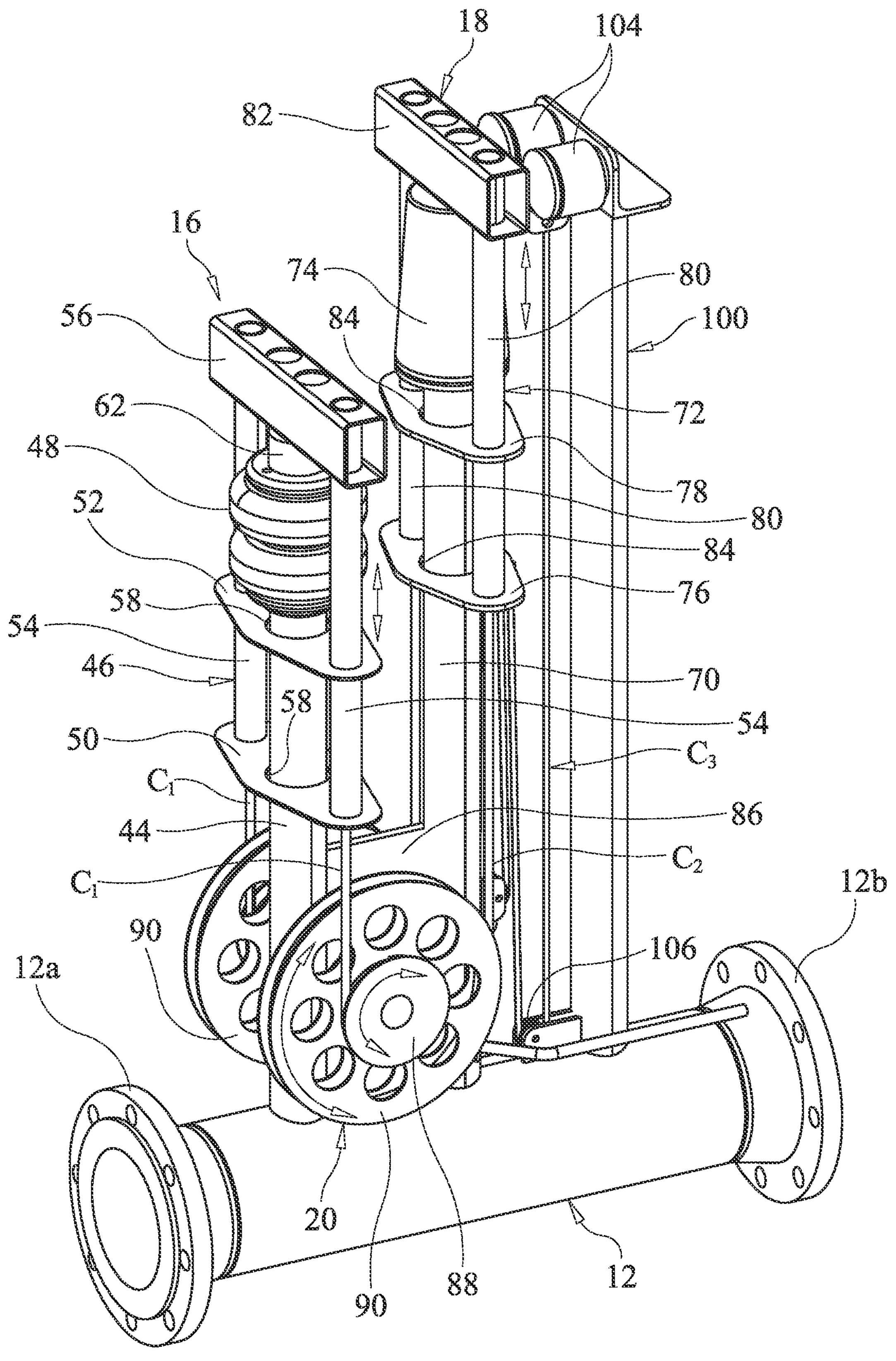
FIG. 3 is a first perspective view of the pipe, the pressure measuring device, the pressure compensating structure and the connecting mechanism shown separated from the booster pump in accordance with the first embodiment.

In the second embodiment, the weight W is attached to the top of the movable frame 72, providing a downward force on the fluid filled bladder 74. The weight W applies a predetermined force on the fluid filled bladder 74 and the fluid within the tube 40 to keep balance the pressures within the booster pump 14 (shown FIGS. 1 and 2) during optimal pumping operations. Hence, in the second embodiment, the pulley system 100 of the first embodiment is unnecessary and is eliminated.

Third Embodiment

Figure 11:
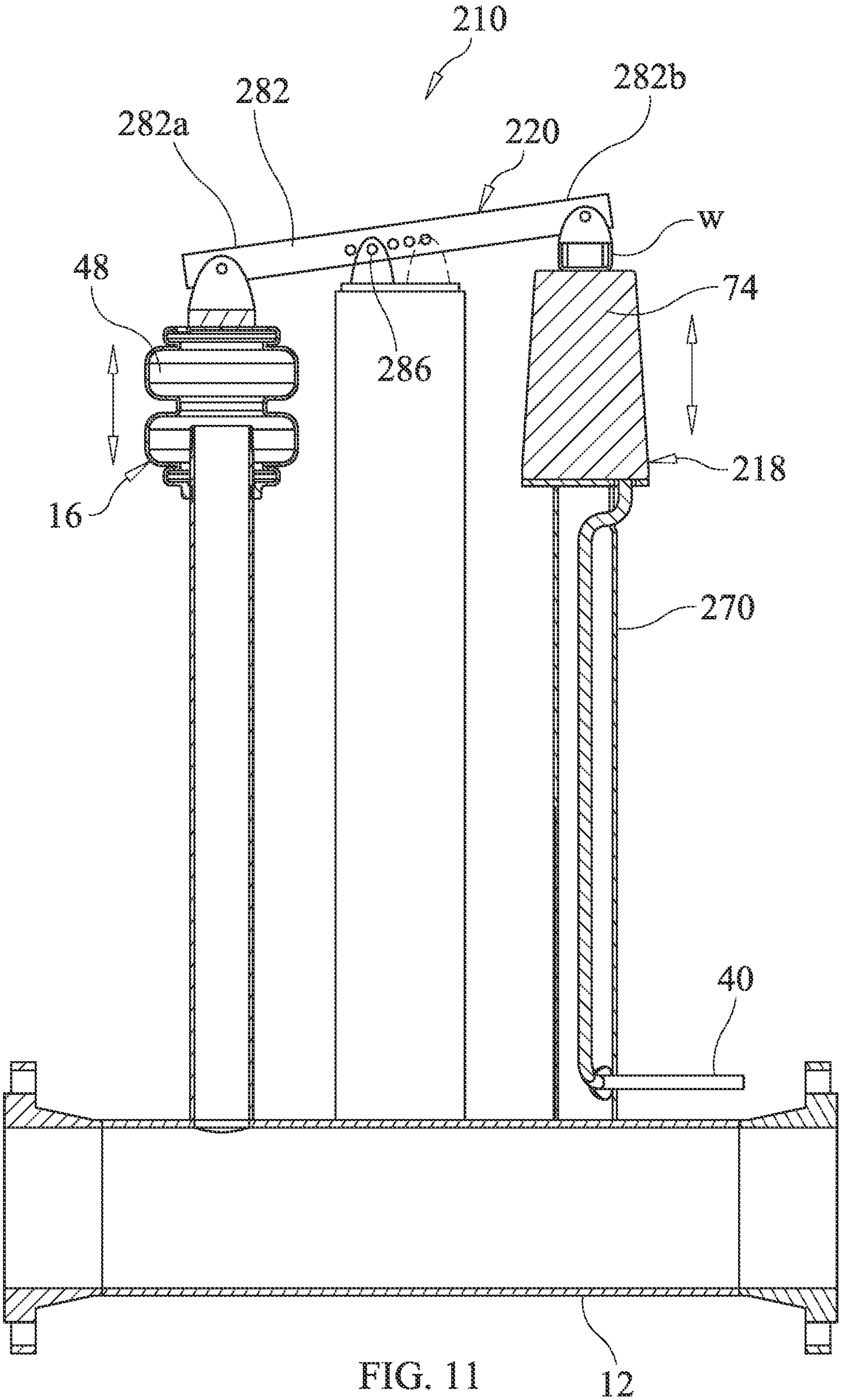
FIG. 11 is a side view of a fluid pressure compensation apparatus having a pipe with a pressure measuring device, a pressure compensating structure and a connecting mechanism in accordance with a third embodiment.

Referring now to FIG. 11, a fluid pressure compensation apparatus 210 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The fluid pressure compensation apparatus 210 in accordance with the third embodiment includes the pressure measuring device 16, a pressure compensating structure 218 and a connecting mechanism 220.

The pressure measuring device 16 is as described above with respect to the first embodiment. The pressure measuring device 16 includes the bladder 48 that is in fluid communication with the hollow interior of the pipe 12.

The pressure compensating structure 218 includes a support member 270 that can be fixed to the pipe 12, or to a nearby structure. The pressure compensating structure 218 includes the fluid filled bladder 74 and attached tube 40.

The connecting mechanism 220 is a lever 282 supported on a fulcrum 286 that can be attached to the pipe 12 or to a nearby structure. The fulcrum 286 is adjustably attached to the pipe 12 such that overall lengths of a first portion 282*a* and a second portion 282*b* of the lever 282 can be adjusted to provide an optimal amount of force to the weight W installed to apply the above-described predetermined force to the fluid filled bladder 74.

The fluid pressure compensation apparatus 210 operates in a manner similar to that described above with respect to the first and second embodiments. However, in the third embodiment, changes in overall length of the bladder 48 due to changes in fluid pressure within the pipe 12 pivot the lever 282 in a corresponding direction about the fulcrum 286. As the lever 282 is pivoted, the fluid filled bladder 74 changes overall height in an opposite direction relative to the change in length of the bladder 48. Accordingly, appropriate pressure changes are provided to the tube 40 (and the pump 14).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the fluid pressure compensation apparatus. Accordingly, these terms, as utilized to describe the present invention should be interpreted relative to a vehicle equipped with the fluid pressure compensation apparatus.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A fluid pressure compensation apparatus, comprising:

a pressure measuring device configured to connect to a pipe so as to be in fluid communication with the pipe and being capable of measuring changes in pressure within the pipe;

a pressure compensating structure having a hydraulic fluid disposed therein; and a connecting mechanism coupled to the pressure measuring device and coupled to the pressure compensating structure such that when the pressure measuring device measures changes in pressure within the pipe, the changes in pressure are mechanically transmitted via the connecting mechanism to the pressure compensating structure causing corresponding movement of the hydraulic fluid in and out of the pressure compensating structure.

2. The fluid pressure compensation apparatus according to claim 1, wherein the pressure measuring device includes a bladder configured to expand and contract linearly in response to changes in pressure in the pipe.

3. The fluid pressure compensation apparatus according to claim 2, wherein the pressure measuring device includes a movable structure configured to move vertically in response to expansion and contraction of the bladder.

4. The fluid pressure compensation apparatus according to claim 3, wherein the movable structure is mechanically connected to the pressure compensating structure via the connecting mechanism such that in response to vertical movement of the bladder the connecting mechanism translates expansion and contraction of the bladder into contraction and expansion of a fluid filled bladder of the pressure compensating structure.

5. The fluid pressure compensation apparatus according to claim 4, wherein the connecting mechanism includes a first pulley, a second pulley, a first cable and a second cable, the first and second pulleys being rigidly connected to one another for pivoting movement as a single element, the first cable connecting the movable structure of the pressure measuring device to the first pulley and the second cable connecting the second pulley to the pressure compensating structure.

6. The fluid pressure compensation apparatus according to claim 4, wherein the connecting mechanism includes a lever that pivots on a fulcrum, a first end of the lever being connected to the movable structure of the pressure measuring device and a second end of the lever being connected to the pressure compensating structure.

7. The fluid pressure compensation apparatus according to claim 1, further comprising a pump having a pumping chamber in fluid communication with the pipe, a pressure chamber and a seal defining a boundary between the pumping chamber and the pressure chamber, the pressure chamber being in fluid communication with the pressure compensating structure.

8. A fluid pressure compensation apparatus, comprising:

a pump having a pumping chamber in fluid communication with a pipe, a pressure chamber and a seal defining a boundary between the pumping chamber and the pressure chamber;

a pressure measuring device configured to be in fluid communication with the pipe upstream of the pump and being capable of measuring changes in pressure within the pipe;

a pressure compensating structure having a hydraulic liquid disposed therein that is in fluid communication with the pressure chamber of the pump; and a connecting mechanism coupled to the pressure measuring device and coupled to the pressure compensating structure such that when the pressure measuring device measures changes in pressure within the pipe the changes in pressure are mechanically transmitted via the connecting mechanism to the pressure compensating structure causing corresponding movement of the hydraulic fluid in and out of the pressure compensating structure and corresponding changes in pressure within the pressure chamber of the pump.

9. The fluid pressure compensation apparatus according to claim 8, wherein the pressure measuring device includes a bladder configured to expand and contract linearly in response to changes in pressure in the pipe.

10. The fluid pressure compensation apparatus according to claim 9, wherein the pressure measuring device includes a movable structure configured to move vertically in response to expansion and contraction of the bladder.

11. The fluid pressure compensation apparatus according to claim 10, wherein the movable structure is mechanically connected to the pressure compensating structure via the connecting mechanism such that in response to vertical movement of the bladder the connecting mechanism translates expansion and contraction of the bladder into contraction and expansion of a fluid filled bladder of the pressure compensating structure.

12. The fluid pressure compensation apparatus according to claim 11, wherein the connecting mechanism includes a first pulley, a second pulley, a first cable and a second cable, the first and second pulleys being rigidly connected to one another for pivoting movement as a single element, the first cable connecting the movable structure of the pressure measuring device to the first pulley and the second cable connecting the second pulley to the pressure compensating structure.

13. The fluid pressure compensation apparatus according to claim 11, wherein the connecting mechanism includes a lever that pivots on a fulcrum, a first end of the lever being connected to the movable structure of the pressure measuring device and a second end of the lever being connected to the pressure compensating structure.

14. The fluid pressure compensation apparatus according to claim 8, further comprising a pump having a pumping chamber in fluid communication with the pipe, a pressure chamber and a seal defining a boundary between the pumping chamber and the pressure chamber, the pressure chamber being in fluid communication with the pressure compensating structure.

15. A method of compensating fluid pressure, comprising pumping fluid through a pipe with a pump having a pumping chamber in fluid communication with the pipe, a pressure chamber and a seal that defines a boundary between the pumping chamber and the pressure chamber;

measuring fluid pressure within the pipe with a pressure measuring device connected to and in fluid communication with the pipe upstream of the pump;

providing a pressure compensating structure having a bladder with hydraulic fluid disposed therein, the bladder being in fluid communication with the pressure chamber of the pump; and mechanically adjusting a pressure within the pressure chamber of the pump using hydraulic fluid from the pressure compensating structure in response in response to the pressure measuring device measuring changes in pressure within the pipe.

16. The method of compensating fluid pressure according to claim 15, further comprising mechanically coupling the pressure measuring device to the pressure compensating structure with a connecting mechanism such that changes in pressure measured by the pressure measuring device causes movement of the connecting mechanism and movement of the connecting mechanism causes corresponding changes in pressure within the bladder.

17. The method of compensating fluid pressure according to claim 16, further comprising providing the pressure measuring device with a bladder that changes a vertical height thereof in response to changes in the measured pressure within the pipe.

18. The method of compensating fluid pressure according to claim 17, further comprising providing the connecting mechanism with a pulley/cable arrangement mechanically connecting changes in vertical height of the bladder of the pressure measuring device to changes in vertical height of the bladder of the pressure compensating structure.

19. The method of compensating fluid pressure according to claim 17, further comprising providing the connecting mechanism with a lever structure that pivots about a pivot point with a first end of the lever being connected to the bladder of the pressure measuring device and a second end of the lever being connected to the bladder of the pressure compensating structure.

* * * * *